United States Patent [19]

Suginoya et al.

[11] Patent Number: 4,639,088
[45] Date of Patent: Jan. 27, 1987

[54] MULTI-COLOR DISPLAY DEVICE AND PROCESS OF FABRICATING SAME

[75] Inventors: Mitsuru Suginoya; Koji Iwasa; Hitoshi Kamamori; Yutaka Sano; Yumiko Terada, all of Tokyo, Japan

[73] Assignee: Seiko Instruments & Electronics Ltd., Tokyo, Japan

[21] Appl. No.: 632,488

[22] Filed: Jul. 19, 1984

[30] Foreign Application Priority Data

Jul. 19, 1983 [JP] Japan ............................ 58-131501

[51] Int. Cl.⁴ .............................................. G02F 1/13
[52] U.S. Cl. ............................................... 350/339 F
[58] Field of Search ..................... 350/339 F, 339 R

[56] References Cited

U.S. PATENT DOCUMENTS 4,494,824  1/1985  Nakamura et al. ............. 350/339 R

FOREIGN PATENT DOCUMENTS 58-46325  3/1983  Japan .............................. 350/339 F

OTHER PUBLICATIONS

Levenson, M. D., "Color-Mask Plate for Color Liquid Crystal Displays," IBM Tech. Disc. Bull., vol. 24, No. 8 (Jan. 1982) p. 4036.

*Primary Examiner*—John K. Corbin
*Assistant Examiner*—Richard F. Gallivan
*Attorney, Agent, or Firm*—Robert E. Burns; Emmanuel J. Lobato; Bruce L. Adams

[57] ABSTRACT

A liquid crystal display having a multi-color display is fabricated with a plurality of display electrodes on a first substrate, on which a color filter is selectively formed by electro-depositing a polymer together with coloring matter and electroconductive particles so that the display electrodes have different colors and electroconductivity. A counter electrode is formed on a second substrate and a liquid crystal material is sandwiched between the first and second substrates, so that the material serves, in operation, as a light shutter controlled by the voltage applied between said color filter via said display electrodes and the counter electrode.

16 Claims, 2 Drawing Figures

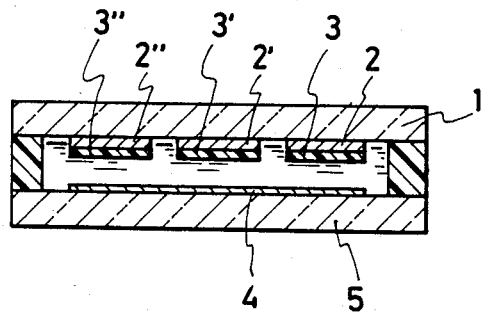
FIG. 1 (PRIOR ART)
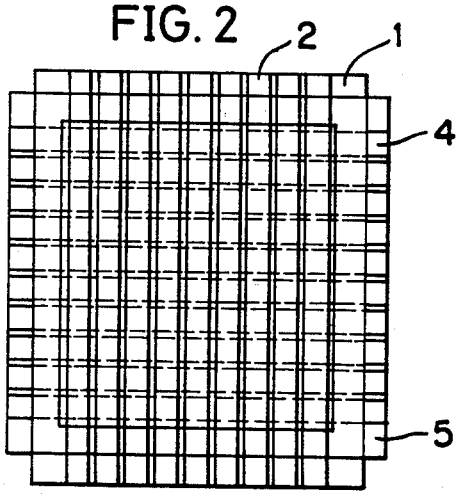
FIG. 2
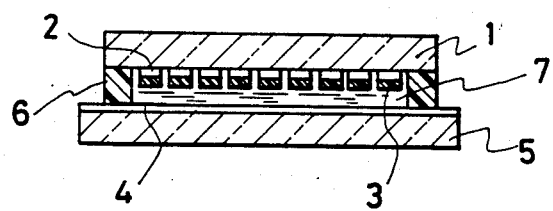

MULTI-COLOR DISPLAY DEVICE AND PROCESS OF FABRICATING SAME

BACKGROUND OF THE INVENTION

The present invention relates to a multi-color display device and a process of fabricating the multi-color display device using color filters and, more particularly, to a process of fabricating the multi-color display device provided with color filters which are made of polymer layers formed by electro-deposition.

FIG. 1 shows one example of a conventional multi-color display device which makes use of color filters. In FIG. 1 numeral 1 indicates a transparent substrate; numeral 2 a display electrode made of a transparent conductive film; numeral 3 a color filter formed in close contact with the surface of the display electrode 2; numeral 4 a transparent counter electrode; and numeral 5 a transparent rear substrate. The space between the two substrates 1 and 5 is filled with a substance which functions as an optical shutter which can be opened or closed by the application of a voltage, such as a liquid crystal or an electrochromic material, and the color filters 3, 3' and 3" are formed to have different colors. Several colors can be displayed by selectively applying a voltage between the display electrodes 2, 2' and 2" and the transparent counter electrode 4.

This multiplication of the colors of a display using color filters is very effective in practice because it is considered that the method is convenient, any color can be easily obtained, and this color multiplication can be used in combination with various display materials and systems.

However, when fabricating this multi-color display device using color filters, no discrepancy can be allowed between the patterns on the display electrodes and the patterns on the color filters formed on the surfaces of the display electrodes. Especially when realizing a color graphic display using fine patterns in the three primary colors, duplicating the patterns of the display electrodes and the color filters presents a serious problem which makes the fabrication difficult. Another problem concerns color changes during the formation of the various colors, which complicates the process. In particular, if the coloration is effected by a dyeing method, resist-printing steps are needed, which make the fabrication process more complex. Namely parts which have already been dyed should not be dyed again in subsequent dyeing steps. Moreover, the resist printing technique itself presents difficult problems which must be solved for each dye.

Methods of forming the color filters that have been considered, generally speaking, use means such as screen printing or photolithography. Screen printing does not require any resist printing, but has limitations concerning size reduction so that positional accuracy becomes worse as the number of colors increases, with resultant discrepancies in the display pattern. Photolithography can produce fine patterns but a photolithographic step is necessary for each change of color, and resist printing is also needed to prevent re-dyeing so that the process becomes very complicated and the advantage of a convenient color-increasing means is lost.

The color filters obtained by the above mentioned methods are made of insulator layers, and the display device is formed in such a way that an insulator is sandwiched between a display electrode and display material. Losses in the drive voltage are caused by the drops in voltage across the color filters, thus obstructing the drive at low voltages.

SUMMARY OF THE INVENTION

It is, therefore, an object of the present invention to propose a convenient process for fabricating a multi-color display device in which no pattern shift occurs, even when the display electrode pattern is fine, in which many kinds of colors can be used without any special resist printing steps, and which uses durable color filters so that it is suitable for a low-voltage drive. To attain these objects, the color filters are fabricated by a method in which display electrodes on the substrate are utilized as the electrodeposition electrodes, and color layers are formed by electrodeposition from a solution containing polymers, a coloring matter and electroconductive particles.

According to this method, the display electrode can be formed by any desired pattern-forming operation such as vacuum evaporation, sputtering or etching using a mask, and a display electrode with no pattern displacement can be formed by electrodepositing polymers, a coloring matter and electroconductive particles selectively onto the display electrode to which a voltage is applied. By repeating these steps, moreover, an increase in colors can be easily obtained. The substrate used in this method is not limited as far as its material and shape is concerned, so long as its surface is insulating, because a display electrode having excellent adhesion to the substrate is selected.

The multi-color display device obtained in this way has electroconductive color films which are prone to little voltage drop when a voltage is applied, and is thus suitable for a low-voltage drive.

BRIEF DESCRIPTION OF THE DRAWING

FIG. 1 shows one example of a conventional multi-color display device to which color filters are applied. FIG. 2 shows one example of the multi-color display fabricated by the method of the present invention.

DETAILED DESCRIPTION OF THE INVENTION

The method of forming color films by electrodepositing polymers in accordance with an important feature of the present invention will be described hereinafter. One means of electrodepositing polymers onto a display electrode is a method by which a monomer is electrochemically polymerized on the electrode. An example of this method has been reported (in Metal Surface Technology Vol. 19, No. 12, 1968) by which a variety of vinyl compounds can be electrochemically polymerized on an iron plate to form a polymer surface film. In recent years, moreover, research has been conducted into methods by which pyrrole or thiophene is electrochemically polymerized to form a conductive polymer such as polypyrrole or polythienylene on the electrode. However, these means for directly polymerizing monomers in an electrochemical manner are not yet efficient in practice. For use in the present invention, there are still problems in that the films obtained are already colored and that the coloring is not sufficiently varied. In another method of electrodepositing a polymer onto the electrode, the polymer is made insoluble and is deposited onto the electrode by a polymer solution. One example of this method is known in the industry as the so-called "electrocoating" method by which a pigment is dispersed in an aqueous solution of a polymer, and a piece of metal is dipped into the solution and is used as an electrode so that a color layer is electrodeposited onto the electrode. This electro-coating method is used for precoating automotive bodies. The principle of this method involves introducing a hydrophilic group such as a carboxyl group into a polymer, and then neutralizing and making water-soluble the carboxyl group by an inorganic alkali or organic amine. The electrode is dipped into an aqueous solution of this water-soluble polymer and a voltage is applied to the electrode. The carboxyl anions dissociated in the aqueous solution migrate toward the anode and react on the electrode with the protons which are generated by the electrolysis of the water, so that the polymer becomes insoluble to water and deposits. More specifically, the reactions expressed by the following formula occur on the anode so that the polymer deposits thereon:

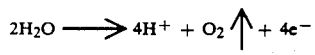

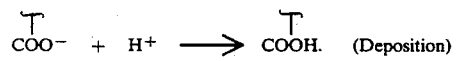  (Deposition)

On the other hand, if a basic group (such as a polyamine) is used as the hydrophilic group and is neutralized and made water-soluble by an acid, a polymer is found to deposit upon the cathode.

In this electro-coating operation, a film thickness of 10 to 20 μm is usually obtained by applying a voltage of between 100 to 200 V. For the color filter according to the present invention, however, thinner color films are preferable. For this purpose, it is necessary to determine the most suitable resin concentration, voltage and solvent composition, as will be described in examples given below.

As the polymer for the anionic electrodeposition, an adduct of a natural drying oil and maleic acid, an alkyd resin into which a carboxyl group is introduced, an adduct of an epoxy resin and maleic acid, a polybutadiene resin into which a carboxyl group is introduced, or a copolymer of acrylic or methacrylic acid and its ester can be used. Depending on the characteristics of the electrodeposited surface film, another polymer or an organic compound having a functional group may be introduced into the framework of the first polymer. When light is observed through color filters, as in the present invention, the color films must be transparent, and a polymer such as an acrylic or polyester resin is suitable for meeting that requirement. Moreover, the quantity of hydrophilic functional groups such as carboxyl or hydroxyl groups in the polymer plays an important role. The electrodeposited film is not sufficiently insoluble and forms an irregular film if there are too many hydrophilic groups. The water-solubility during neutralization becomes insufficient if there are too few hydrophilic groups. Water is the main component of the solvent of the polymer, and it contains as the polymerizing solvent, a hydrophilic solvent such as isopropanol, n-butyl alcohol, t-butyl alcohol, methyl "Cellosolve", ethyl "Cellosolve", isopropyl "Cellosolve", butyl "Cellosolve", diethylene glycol methyl ether, diethylene glycol ethyl ether or diacetone alcohol. The type and quantity of the hydrophilic solvent have a strong influence upon the thickness and evenness of the electrodeposited film.

In this coloring method, a pigment is used in the electro-coating operation and the charged pigment is subjected to electrophoresis together with the polymer annd is included in the film. To obtain the transparent color filters of the present invention, the obscuring ability processed by most pigments is not required, and since the number of transparent pigments is limited, a free choice of colors is difficult to obtain.

Therefore, the present invention has devised a method of electrodepositing a dye as the coloring matter together with a polymer. In order to electrodeposit the dye with the polymer, the dye molecules must be charged and subjected to electrophoresis. With a water-soluble dye, the dissociated dye ions have the effect of adding to the supporting electrolyte, which produces increases in the current and the film thickness, and irregularities in the film. A dye which is barely or not soluble in water usually coagulates in the water, but the electrodeposited polymer can act as a kind of soap with hydrophobic and hydrophilic groups, and can exhibit some dispersion of the organic dye molecules so that they can separate into fine particles and be electrodeposited together with the polymer, as has been found in the present invention. In this case, it is necessary to make the rates of electrodeposition of the dye and the polymer substantially equal to each other. This can be controlled by the composition of the solution.

The electroconductive particles making the electrodeposited color films conductive are dispersed as charged particles attracted by the polymers in the solution, like the pigment used in the electrocoating, and are subjected to electrophoresis by the applied voltage so that they are taken into the color films. The diameter and quantity of the conductive particles strongly influence the electrical resistance and transparency of the color films. The conductive particle is made of tin oxide, indium oxide, antimony oxide, zinc oxide, cadmium oxide, gold, silver and nickel.

EXAMPLES

The process for fabricating the multi-color display device using color filters will now be specifically described in connection with examples thereof.

(Example 1)

FIG. 2 shows an example of the multi-color display device to which the color filter fabrication process according to the present invention is applied.

In the following, the process of fabricating the multi-color display device, as shown in FIG. 2, will be specifically described.

(1) Patterning Step

Reference numeral 1 denotes a transparent substrate onto which a transparent conductive film of tin oxide is formed by a spray-coating method. The transparent conductive film is patterned into a striped shape by an etching method to form display electrodes 2.

(2) Electrodepositing Step

Next, paint (i.e., S-Via ED-3000, produced by Shinto Toryo KK) of the following composition:

| S-Via ED-3000 | |
|---|---|
| Water-soluble polyester resin | ⎫ |
| Water-soluble melamine resin | ⎬ 70% by weight |
| Butyl Cellosolve | ⎭ | is used to prepare an electrodeposition bath of this composition:

| Substance | Wt. Ratio |
|---|---|
| S-Via ED-3000 | 10 |
| Water | 108 |
| Tin oxide powder | 7 |
| Silver pigment | 3 |
| Methyl Cellosolve | 12 |
| Oil-soluble dye | x |

| Ethyl Cellosolve | |
| n-butanol | 30% by weight |

The oil-soluble paint used is limited to one that is soluble in a hydrophilic solvent and preferably has a metal complex salt structure which has an extremely good light resistance. The oil-soluble paint has a molecular structure that is expressed by the following formula, for example (known under the tradenames Aizen Spilon, Oleosol Fast or the like):

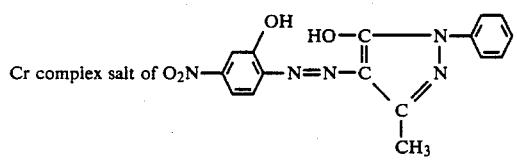

Color Index No. Solvent Red 8.

The bath-preparing procedure involves adding the tin oxide powder and the silver pigment to the S-Via ED-3000, and dispersing them to obtain a paste by means of a pigment dispersion mixer. Water is added to that paste and is blended therewith to provide a well-mixed solution.

The dye is then dissolved in the methyl Cellosolve. The weight ratio x of the dye can be any value selected so that it does not exceed the range of solubility of the dye in methyl Cellosolve. The methyl Cellosolve in which is dissolved the dye is added to the first solution so that the dye is uniformly dispersed. The methyl Cellosolve acts as a dispersion medium for the dye, but it would make the film become thicker or irregular if too much of it were added, or if the number of carbon atoms in the alkyd groups of the Cellosolve is increased.

The transparent substrate 1 on which is formed the display electrodes 2 is dipped into the electrodeposition bath thus prepared. Those of the stripe-shaped display electrodes which are to be dyed the same color are selected, and the group of electrodes thus selected are used as anodes to which a voltage of 20 V is applied for 3 minutes. After this, the transparent substrate 1 is pulled out of the bath and well rinsed to wash away the solution which adhere to the portions to which no power was supplied. After this rinsing operation, the transparent substrate 1 is dried, leaving very transparent color films formed over the group of electrodes to which the voltage was applied.

(3) Hardening Step

Next, the polyester resin and the melamine resin in the color films formed by the electrodeposition are baked and set by a condensation reaction. If the baking is conducted in air at 175° C. for 30 minutes, the color films are completely hardened. These hardened color films will not be re-dyed, even if they are dipped into the electrodeposition bath again. Thereafter, second or subsequent formations of color films are conducted by again selecting groups of display electrodes to be dyed the same color, and repeating the electrodeposition and hardening steps with an electrodeposition bath in which a dye of a different color has been dispersed.

In the present example, striped color filters 3 having red, blue or green stripes of 200 μm are formed very conveniently by a process consisting of a patterning step, a step of electrodepositing red film, a hardening step, a step of electrodepositing blue film, a hardening step, a step of electrodepositing green film, and a final hardening step. The color filter thus fabricated has no color deterioration and has uniform characteristics that are resistant to attack by acids, alkalis, a variety of organic solvents, and hot water. Moreover, the dye of the metal complex salts used in the color films is very stable, and has an excellent light-resistance such that at least 95% of the initial light absorptivity, even after a carbon arc test of 360 hours.

Using the method thus far described, the color filters 3 are formed on the display electrodes 2, and the transparent substrate 1 is integrated to form a cell with a spacer 6 and a transparent rear substrate 5 on which transparent counter electrodes 4 are formed in stripes so that the stripes of the display electrodes 2 and the counter electrodes 4 intersect at right angles. The cell is filled with TN-FEM liquid crystal to provide the display material 7, thus completing the multi-color liquid crystal display. In this case, a voltage is applied between the display electrodes 2 and the counter electrodes 4, and the cell is sandwiched between a pair of polarizer which have parallel axes of transmission. The color of the transparent color filters 3 can be seen if observed from the transparent substrate 1 side or the transparent rear substrate 5 side, and go black if the applied voltage is cut. When light is illuminated thereon from the direction of the rear substrate 5, the colors of the color filters 3 are more effectively displayed because the cell is so transparent.

Because of the conductivity imparted to the color filter films, moreover, the voltage-transmissivity characteristics of the electro-optical characteristics of a multi-color display of the present example were found to be substantially equal to those of the liquid crystal material used therein.

Thus, the process of fabricating the multi-color display device of the present example has been found to be suitable for providing a color filter with a fine pattern without any reduction in the display quality even although this process is simple and convenient, as well as a colorgraphic display which can be driven by a very reliable low-voltage matrix.

(Example 2)

The display material 7 of Example 1 was replaced with a negative guest-host liquid crystal using a black dichromatic dyestuff, and the substrate 1 was made of a white material (e.g., white ceramic). Except for these details, a multi-color liquid crystal display device was fabricated in the same way as in Example 1. In this case, when a voltage was applied between the display electrodes 2 and the counter electrodes 4 and the display was observed from the transparent rear substrate 5 side through a polarizing plate, the colors of the color filters 3 were displayed brightly. If the voltage was interrupted, the liquid crystal looked black, or the color of the dichromatic dyestuff thereof. Effects similar to those of the Example 1 were also obtained by the present example.

(Example 3)

The display material 7 of Example 1 was made of DSM liquid crystal, and the substrate 1 was patterned with aluminum by mask evaporation to form the display electrodes 2. Otherwise this multi-color liquid crystal display was fabricated in the same way as in Example 1. In this case, when a voltage was applied between the display electrodes 2 and the counter electrodes 4, and the display was observed from the transparent rear substrate 5 side, the DSM liquid crystal achieved a light-scattering state so that the colors of the color filters 3 were displayed against opaque white. When the voltage was interrupted, the light-scattering state disappeared so that the DSM liquid crystal became a dark color. Incidentally, in order to efficiently establish the light-scattering state of DSM liquid crystal, it was necessary to pass an ion current to some extent, but the high resistance of the color filters 3 hindered this. By providing extra transparent electrodes on the color filters, and by using them as the voltage-applying electrodes, therefore, the drive voltage could be reduced, and effects similar to those of Example 1 could still be obtained.

(Example 4)

The electrodeposition bath of Example 1 was replaced by paint (i.e., POWERMITE 3000-10, produced by Nippon Paint KK) of the following composition:

| POWERMITE 3000-10 | |
|---|---|
| Water-soluble acrylic resin } Water-soluble melamine resin } | 60% by weight |
| Butyl Cellosolve } Isopropyl alcohol } | 40% by weight | was used to prepare an electrodeposition bath of this composition:

| Substance | Wt. Ratio |
|---|---|
| POWERMITE 3000-10 | 10 |
| Water | 113 |
| Indium oxide powder | 5 |
| Nickel powder | 2 |
| Ethylene glycol | 20 |
| Dispersion dye | x |

The dispersion dyes used are available on the market and frequently contain an anionic dispersant, which would be ionized in the bath to cause the current to increase. Therefore, it is preferable that the dispersion dye contains no dispersant.

The bath was made up by adding the indium oxide and nickel powders to the POWERMITE 3000-10, and dispersing them by means of a pigment dispersion mixer to provide a paste. Water was added to this paste and blended to form a solution. The dispersion dye was then dispersed uniformly in the ethylene glycol within a range of $x < 1.5$, and was added to and mixed with the first solution.

In the same way as in Example 1, a multi-color liquid crystal display was fabricated, and effects similar to those of Example 1 are obtained. It was, however, found that only a limited number of dyes could be used as the oil-soluble dye of a metal complex salt to provide the good light-resistance characteristics of the color filter.

(Example 5)

The electrodeposition bath of the Example 5 was changed so that it had the following composition:

| Substance | Wt. Ratio |
|---|---|
| S-Via ED-3000 | 20 |
| Water | 105 |
| Tin oxide powder | 10 |
| Indium oxide powder | 5 |
| Oil-soluble dye | x |

This bath was made up by adding the tin oxide powder and the indium oxide powder to S-Via ED-3000, and the oil-soluble dye was then added within a range of $x < 1.0$. These were mixed by a dispersion mixer to provide a paste. Water was then added to the paste, and the mixture was blended to form the electrodeposition bath. A multi-color display was fabricated similar to that of Example 1, and effects similar to those of Example 1 could be obtained.

It is quite obvious that the oil-soluble dye used in the present example need not be limited to one that is soluble in a hydrophilic solvent, but it should preferably have a good light-resistance.

As has been specifically described hereinbefore in the examples, the process of fabricating a multi-color display according to the present invention is so simple and convenient that it can provide color filters withouth the use of any special resist printing means for separating the colors. Moreover, the color filters are strong and have no pattern distortion, so that they can provide a high display quality and reliability, even if they are combined with a display material such as a liquid crystal. Since the color filters are conductive, moreover, the multi-color display fabricated by this process has only small losses in the drive voltage, so that it can be driven at a low voltage.

What is claimed is:

1. A process of fabricating a multi-color display device comprising the steps of: forming a plurality of display electrodes on a first substrate, selectively forming a color filter on each display electrode by electrodepositing a polymer together with coloring matter and electroconductive particles so that the display electrodes have different colors and electroconductivity, forming a counter electrode on a surface of a second substrate, and sandwiching a display material between said first substrate and said second substrate, said display material serving, in operation, as a light shutter controlled by the voltage applied between said color filter via said display electrodes and the counter electrode.

2. A process of fabricating a multicolor display device as set forth in claim 1, wherein said electroconductive particles are made of a substance selected from the group consisting of tin oxide, indium oxide, antimony oxide, zinc oxide, cadmium oxide, gold, silver and nickel.

3. A process of fabricating a multicolor display device as set forth in claim 1, wherein said polymer has an anionic deposition characteristic and is electrolytically deposited on said display electrodes by anodic electrolysis.

4. A process of fabricating a multicolor display device as set forth in claim 3, wherein said polymer having an anionic deposition characteristic is made of an acrylic resin containing carboxyl group or a polyester resin containing carboxyl group these being neutralized by alkali and made water-soluble or made of a mixture of water-soluble melamine resin and said acrylic resin or said polyester resin.

5. A process of fabricating multi-color display device as set forth in claim 1, wherein said coloring matter comprises a dye which is barely soluble or insoluble in water.

6. A process of fabricating multi-color display device as set forth in claim 5 wherein said dye is a dispersion dye or an oil-soluble dye.

7. A process of fabricating multicolor display device as set forth in claim 6, wherein said oil-soluble dye has a metal complex salt structure and is soluble in a hydrophilic solvent.

8. A multi-color display device fabricated by the method of claim 1.

9. A process of fabricating a multi-color display device comprising the steps of: forming a plurality of display electrodes on a first substrate; forming electrically conductive color filters of different colors on different respective groups of the display electrodes by electrodeposition from a solution containing polymer, coloring matter and electroconductive particles; forming a counter electrode on a surface of a second substrate; and sandwiching an electrooptic display material between the display and counter electrodes formed on the first and second substrates.

10. A process according to claim 9; wherein said electroconductive particles are made of a substance selected from the group consisting of tin oxide, indium oxide, antimony oxide, zinc oxide, cadmium oxide, gold, silver and nickel.

11. A process according to claim 9; wherein said polymer has an anionic deposition characteristic and is electrolytically deposited on said display electrodes by anodic electolysis.

12. A process according to claim 11; wherein said polymer having an anionic deposition characteristic is made of an acrylic resin containing carboxyl group or a polyester resin containing carboxyl group these being neutralized by alkali and made water-soluble or made of a mixture of water-soluble melamine resin and said acrylic resin or said polyester resin.

13. A process according to claim 9; wherein said coloring matter comprises a dye which is barely soluble or insoluble in water.

14. A process according to claim 13; wherein said dye is a dispersion dye or an oil-soluble dye.

15. A process according to claim 14; wherein said oil-soluble dye has a metal complex salt structure and is soluble in a hydrophilic solvent.

16. A multi-color display device fabricated according to the process of claim 9.

* * * * *